United States Patent [19]
Katta et al.

[11] Patent Number: 5,621,799
[45] Date of Patent: Apr. 15, 1997

[54] SCRAMBLED TRANSMISSION SYSTEM

[75] Inventors: Noboru Katta, Itami; Hiroki Murakami, Osaka; Susumu Ibaraki; Seiji Nakamura, both of Toyonaka, all of Japan

[73] Assignee: Matsushita Electric Industrial Co., Ltd., Osaka-fu, Japan

[21] Appl. No.: 325,057

[22] Filed: Oct. 19, 1994

[30] Foreign Application Priority Data

Oct. 19, 1993 [JP] Japan ................................. 5-260754
Nov. 9, 1993 [JP] Japan ................................. 5-279529

[51] Int. Cl.[6] .............................. H04N 7/167; H04L 9/00
[52] U.S. Cl. ........................ 380/48; 380/49; 380/11; 380/20; 380/46
[58] Field of Search ................................ 232/246; 380/11, 380/19, 20, 31, 32, 43, 44, 48, 49; 370/11

[56] References Cited

U.S. PATENT DOCUMENTS 5,285,497  2/1994  Thatcher et al. ........................ 380/49

*Primary Examiner*—David C. Cain
*Attorney, Agent, or Firm*—Wenderoth, Lind & Ponack

[57] ABSTRACT

A scrambled transmission system for transmitting a digital data containing variable length coding conforming to a MPEG standard includes a scramble key generator for generating a scramble key at a timing of each GOP head. A GOP head detector detects each GOP head and causes the scramble key generator to refresh the scramble key. A seed generator generates a scramble seed based on said scramble key at a timing of each slice head. A slice head detector detects each slice head and causes the seed generator to refresh the scramble seed. A random number generator scrambles the digital data based on the scramble seed. A multiplexer embeds the scramble key in the extension_and_user_data of the scrambled data.

21 Claims, 5 Drawing Sheets

SCRAMBLED TRANSMISSION SYSTEM

BACKGROUND OF THE INVENTION

1. Field of the Invention

The present invention relates to a scrambled transmission system including a scrambling apparatus for scrambling signals used in the transmission and storage of digitally coded signals to restrict who can reproduce the scrambled signals by providing the decoding procedure to authorized parties only and a descrambling apparatus for reproducing said scrambled signals and, more particularly, to a scrambled transmission system featuring high recoverability during signal reproduction free from errors occurring prior to signal reproduction.

2. Description of the Prior Art

An example of a conventional scrambled transmission system has a scrambling apparatus including a random number generator, an exclusive-OR circuit, and a multiplexer for multiplexing the key to the scrambled signal and transmitting the multiplexed signal; and a descrambling apparatus including a demultiplexer for separating the key, a random number generator, and an exclusive-OR circuit.

In this conventional scrambled transmission apparatus, the transmission signal is sequentially input to one input of the exclusive-OR circuit, and the output from the random number generator is input to the other input. The scrambling key is applied at each refresh cycle to the random number generator, which re-initializes using the scrambling key to output a random number sequence at a rate equal to the source signal rate. The source signal is therefore scrambled by the exclusive-OR operation using the random number generated by the random number generator. The scrambling key input to the random number generator is multiplexed by the multiplexer to the transmission signal, and transmitted.

At the receiver side, the scrambling key is extracted from the signal transmitted by the multiplexer, and the scrambled signal is input to the exclusive-OR circuit; the extracted scrambling key is input to the random number generator. The random number generator re-initializes using the scrambling key, generates the same random number sequence as that used on the transmission side, and inputs the random number sequence to the exclusive-OR circuit at the same rate as the scrambled signal. As a result, the same random number used on the transmission side is applied to the scrambled signal, thus restoring the source signal and producing the reproduction signal.

In these applications, the scrambling key is often encrypted using a higher-order encryption key, and this encryption key is decrypted on the receiving side to obtain the scrambling key. Because the random number generator is re-initialized using the scrambling key, synchronization can be restored when the random number generator is re-initialized using the next scrambling key in the event synchronization is lost between the transmission and receiving sides during the descrambling process. However, if a simple bit error occurs in the transmitted signal, only the error bit will be incorrectly reproduced, and all remaining bits will be correctly reproduced.

With the preceding apparatus, however, when the source signal is a signal containing variable length coding, and the reproducible audio and video are controlled by applying the signal scrambling process only to a specific code, e.g., the scramble effects code used in pay-per-view broadcasting, the bits and the number of bits that are scrambled will not be correctly detected by the receiver, or the scrambling position will be indeterminate, when a bit error occurs during transmission. As a result, synchronization of random number generator operation will be lost, and will not be recoverable until the random number generator is re-initialized using the next scrambling key.

Therefore, to achieve a bit error propagation rate in scrambled signal reproduction equivalent to that when the signal is not scrambled, it is necessary to synchronize the cycle for scrambling key refreshing to the cycle for decoding the variable length coding. In an MPEG-standard video signal using variable length coding, however, this cycle is less than 10 msec., which is unrealistic as a scrambling key refreshing cycle when it is considered that the scrambling key refreshing cycle in conventional scrambling systems is approximately 1 sec. At a realistic scrambling key refreshing cycle, however, reproduction recoverability drops significantly when bit errors occur. In addition, when only part of the data code is scrambled, such as when scramble effects control is used, a random number value is only required for the number of coded bits when the scrambled signal is obtained, but the complete random number sequence with a number of bits equivalent to the number of code bits must be available at the same time.

SUMMARY OF THE INVENTION

The object of the present invention is therefore to provide a scrambled transmission system which solves these problems.

The present invention has been developed with a view to substantially solving the above described disadvantages and has for its essential object to provide an improved scrambled transmission system for transmitting a digital data containing variable length coding comprises a first scramble key generating means for generating a first scramble key at a first predetermined interval; a second scramble key generation means for generating a second scramble key based on said first scramble key at a second predetermined interval smaller than said first predetermined interval; a scrambling means for scrambling said digital data based on said second scramble key; and a multiplexing means for multiplexing said first scramble key together with said scrambled digital data.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
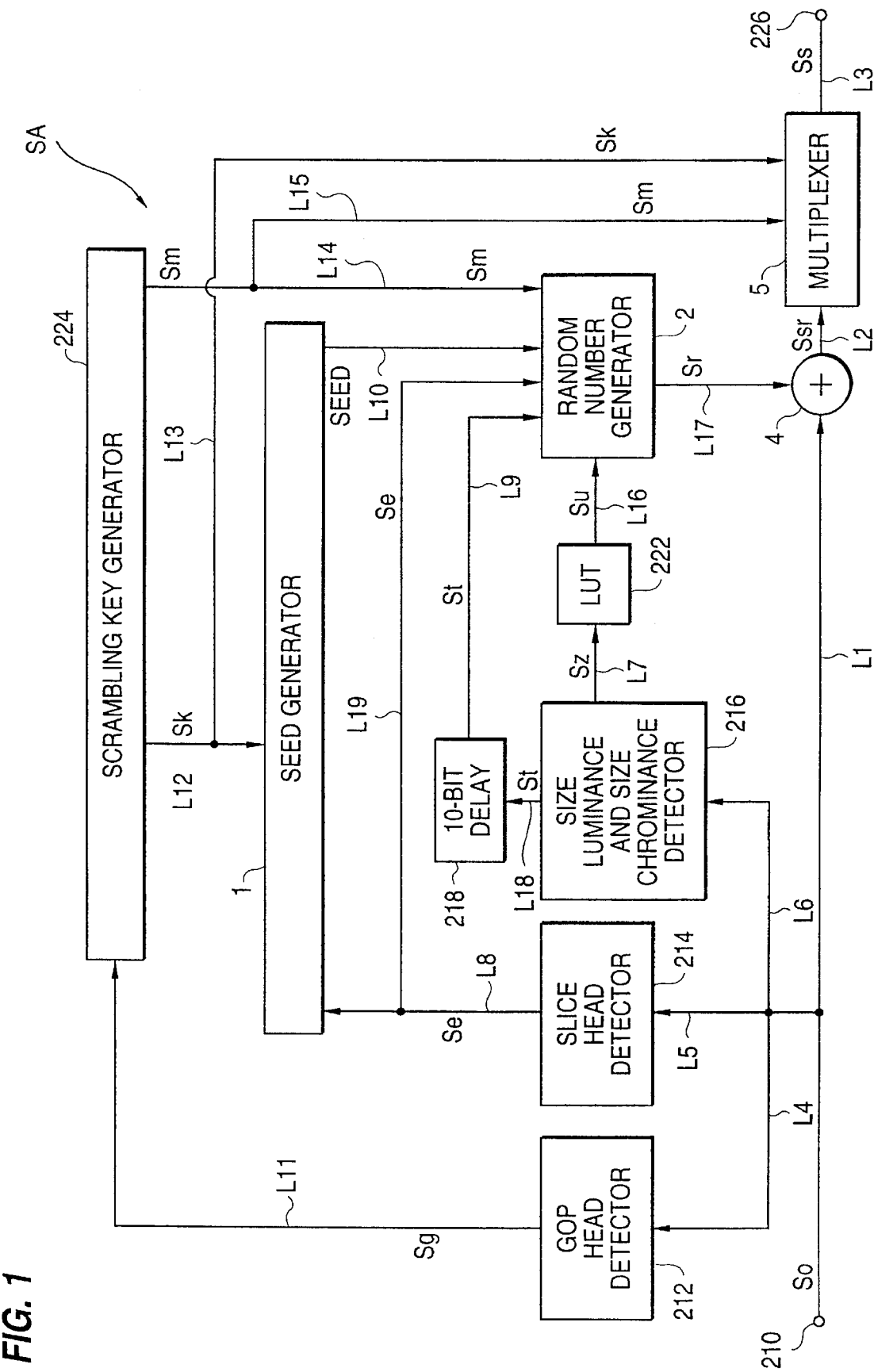
FIG. 1 is a block diagram showing a scrambling apparatus used in a scrambled transmission system according to the present invention.

Referring to FIG. 1, a scrambling apparatus used in a scrambled transmission system according to the present invention is shown. The scrambling apparatus SA includes an input port 210 for receiving a source signal So which is a digital signal containing variable length coding such as a video signal conforming to a Moving Picture Expert Group (MPEG; a joint working group of the International Organization for Standardization (ISO) and the International Electrotechnical Commission (IEC)) standard. MPEG standards include ISO/IEC CD 13818 (a committed draft of the ISO/IEC; commonly known as MPEG-2), and ISO/IEC IS 11172 (1993) (an international standard of ISO/IEC; commonly known as MPEG-1).

Figure 3:
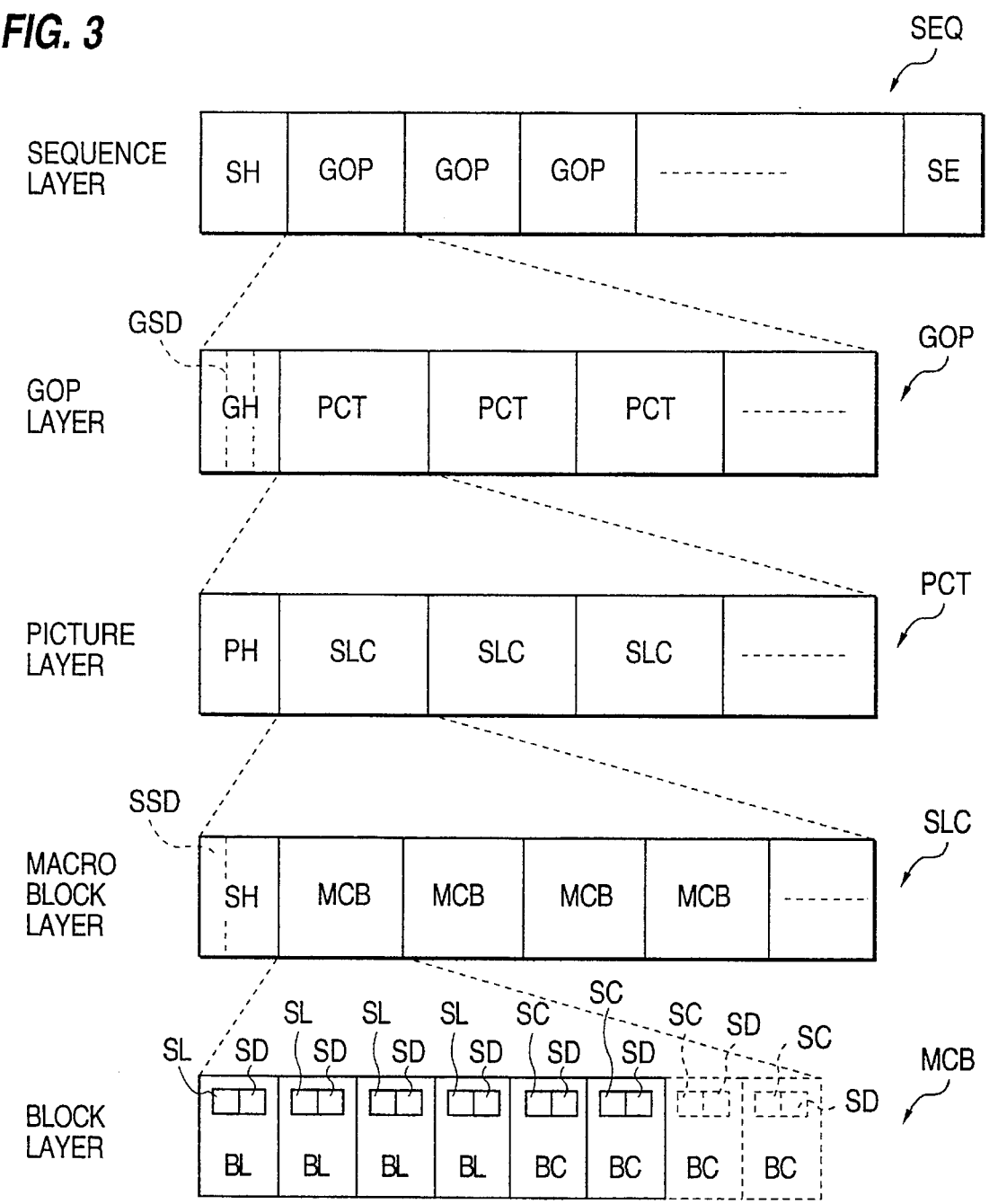
FIG. 3 is a graph in assistance of explaining the structure of video data conforming to the MPEG standard.

Referring to FIG. 3, the concept of a video signal conforming to the MPEG standard is schematically described. The data structure comprises sequence layers, each sequence layer SEQ expressing one moving picture sequence. Each sequence comprises a sequence header SH, which includes the sequence starting code, various parameters, and data, and the coded data for one or more group-of-pictures GOP. Each sequence SEQ further comprises a sequence end SE.

Each layer of group-of-picture GOP within the sequence SEQ comprises frames of any desired length, each frame comprising a header GH containing a start code GSD of the group-of-picture GOP and the coded data of one or more pictures PCT.

Each layer of picture PCT comprises a header PH containing a picture start code, and the coded data of one or more slices SLC.

Each layer of slice SLC comprises a header SH containing a slice start code SSD, and the coded data of one or more macro blocks MCB; any number of macro blocks may be included.

Each macro block MCB contains the compressed and coded data representing the information of the data within 16×16 pixel areas of the source signal So, and is comprised of a plurality of luminance blocks BL and chrominance blocks BC. The luminance block BL contains the coefficient components of discrete cosine transformed (DCT) luminance data within 8×8 pixel areas of the source signal, and includes a $dct_{13}$ do_size luminance code SL and a dct_dc_differential code SD following thereafter. The dct_dc_differential code SD is the coded and compressed luminance data, and the dct_dc_size luminance code SL represents the number of bits of the dct_dc_differential code SD within the luminance block BL. Similarly, the chrominance block BC contains the coefficient components of DCT chrominance data, and includes a dct_dc_size_chrominance code SC and a dct_dc_differential SD following thereafter. The dct_dc_differential code SD is the coded and compressed chrominance data, and the dct_dc_size chrominance code SC represents the number of bits of the dct_dc_differential code SD within the chrominance block BC. Most of these blocks are variable length coded. Therefore, when a bit error occurs, the data following the bit error cannot be read, and recovery is only possible at the beginning of the next slice containing a start code.

Referring back to FIG. 1, the scrambling apparatus SA further includes an exclusive-OR operator 4 connected to the input terminal 210 by a line L1. A GOP head detector 212 is connected to the line L1 by a line L4 for detecting the head GH of group-of-picture GOP from the source signal So and for producing a refresh signal Sg each time the head GH is detected. A scrambling key generator 224 is connected to the GOP head detector 212, a seed generator 1, and a random number generator 2 by lines L11, L12, and L14, respectively. On receipt of the refresh signal Sg, the scrambling key generator 224 is refreshed to produce a scrambling key signal Sk and a scramble mode signal Sm having 11-bit number. These signals Sk and Sm are transmitted to the seed generator 1 and the random number generator 2, respectively. In other words, at an interval of a group-of-picture GOP, the scrambling key signal Sk and the scramble mode signal Sm are repeatedly produced or refreshed such that the signal Sk preferably has different values every time when it is produced, but signal Sm does not. However, it is possible to produce the signal Sk having a constant value and the signal Sm having variable value.

A slice head detector 214 is connected to the line L1 by a line L5 for detecting the slice head SH of each slice from the source signal So to produce an operation request signal Se each time the slice head SH is detected. The slice head detector 214 is further connected to the seed generator 1 and the random number generator 2 by lines L8 and L19, respectively, for transmitting the signal Se.

The seed generator 1 is further connected to the random number generator 2 by a line L10. The seed generator 1 generates a 32-bit random number based on the scrambling key signal Sk each time the operation request signal Se is received from the slice head detector 214. This 32-bit random number is output as a scrambling key seed (SEED) to the random number generator 2 through the line L10.

A size luminance and size chrominance detector 216 is connected to the line L1 by a line L6, and is further connected to a 10-bit delay 218 and a look-up table 222 by lines L18 and L7, respectively. The size luminance and size chrominance detector 216 reads each code in the source signal So to detect the dct_dc_size luminance code SL in luminance block BL and the dct_dc_size chrominance code SC in each chrominance block BC. Thus, from the detected codes SL and SC, the detector 216 obtains the code lengths of the dct_dc_differential codes SD in blocks BL and BC and produces a bit length code signal Sz which is a code indicating thus obtained length of the dct_dc_differential codes SD and a scramble timing signal St.

The 10-bit delay 218 is connected to the random number generator 2 by a line L9 for receiving the scramble timing signal St from the detector 216. The 10-bit delay 218 delays the scramble timing signal St by a period for 10 bits and thereafter transmits thus delayed timing signal St to the random number generator 2. The look-up table 222 is connected to the random number generator 2 by a line L16, and has predetermined values stored therein for searching a specific value with respect to the bit length of the dct_dc_differential codes SD indicated by the signal Sz. The look-up table 222 outputs a bit length signal Su which is a maximum of 11-bit data corresponding to the detected bit length of the dct_dc_differential code to the random number generator 2. Although the line L16 is shown as a line in FIG. 1, it is apparent that the line L16 is a cable comprised of eleven wires each for transmitting a single bit of the signal Su having maximum 11-bit data.

The random number generator 2 is further connected to the exclusive-OR operator 4. When the random number generator 2 receives the operation request signal Se from the slice head detector 214, it also receives signals Sm and SEED from the seed generator 1 and the scrambling key generator 224, respectively, as the scrambling key, and initializes its internal state. Only when the scramble timing sinal St is output from the 10-bit delay 218 does the random number generator 2 generate and output a random number Sr to the exclusive-OR operator 4 for application to the source signal So. It is to be noted that the random number Sr varies its value at a predetermined pattern with respect to the value of the seed signal SEED and the scramble mode signal Sm.

Figure 4:
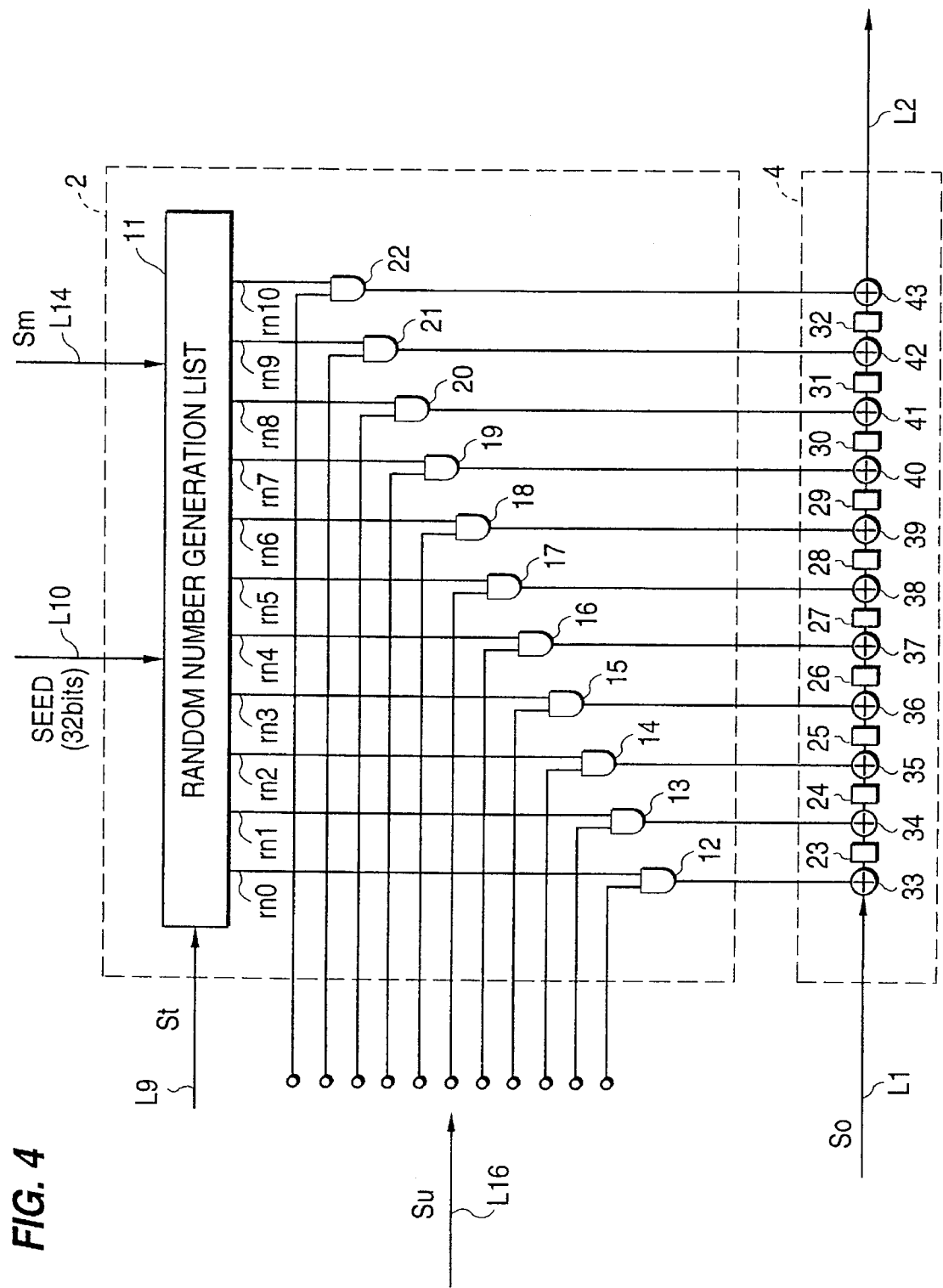
FIG. 4 is a block diagram showing the detail of the exclusive-OR circuit and a random number generator in the scrambling apparatus of FIG. 1.

Referring to FIG. 4, the construction of random number generator 2 and exclusive-OR operator 4 is shown. The random number generator 2 has a random number generation unit 11 and twelve AND circuits 12 to 22. Each one input of AND circuits 12 to 22 is connected to each wire of the cable L16 for receiving each digit of the bit length signal Su in parallel such the first digit of the signal Su enters in the most upper AND circuits 22. Each of the following digits after the first digit also successively enters in each of the following circuits 21 to 12 arranged in the descending order with respect to the reference numerals, as shown in FIG. 4. Each another input of AND circuits 12 to 22 is connected to the random number generation unit 11 through terminals rn0 to rn10 (not shown).

The exclusive-OR operator 4 has ten delay circuits 23 to 32 and eleven exclusive-OR circuits 33 to 43 which are connected to each other in series such that each of delay circuits 23 to 32 are located between two of exclusive-OR circuits 33 to 43, as shown in FIG. 4. Each one input of the exclusive-OR circuits 33 to 43 is connected to each output of the AND circuits 12 to 22, respectively. Another input of the exclusive-OR circuit 33 is connected to the line L1 for receiving the source signal So, and each another input of the exclusive-OR circuits 34, 35, 36, 37, 38, 39, 40, 41, 42, and 43 is connected to output of each delay circuits 23, 24, 25, 26, 27, 28, 29, 30, 31, and 32, respectively. Each output of the exclusive-OR circuits 33, 34, 35, 36, 37, 38, 39, 40, 41, and 42 is connected to output of each delay circuits 23, 24, 25, 26, 27, 28, 29, 30, 31, and 32, respectively. The output of the exclusive-OR circuit 43 is connected to the line L2 for transmitting the signal produced thereby.

The bit length Su (max. 11 bits) is a signal which was input in high-to-low bit sequence from the AND circuit 22 with bit 1 at the bit length of the dct_dc_differential code SD from the low bit set. The scramble timing signal St, delayed 10-bit period after the signal Su, is supplied to the random number generator 2 at a timing when the first bit of the dct_dc_differential code SD is transmitted from the delay circuit 32 to the exclusive-OR circuit 43, so that each bit of the dct_dc_differential code SD is placed in each of the exclusive-OR circuits 33 to 43. The random number generation unit 11 outputs a 11-bit random number signal to the AND circuits 12 to 22 on receipt of the scramble timing signal St.

As a result, the random number exclusive-OR operation is applied only to the part of dct_dc_differential code SD of the source signal So. When the scramble timing signal St is not output to the unit 11, the random number generator 2 outputs zero. Each digit of random number signal Sr produced based on the dct_dc_differential code SD is transmitted to each of the exclusive-OR circuits 33 to 43. Thus, the exclusive-OR operator 4 scrambles the source signal So with the random number signal Sr and produces a primary scrambled source signal Ssr. With respect to the scrambling and descrambling of source signal, the present application is based upon U.S. patent application Ser. No. 08/089,522 which were filed on Jul. 21, 1993, the entire contents of which is expressly incorporated by reference.

A multiplexer 5 is connected to the exclusive-OR operator 4 by a line L2 for receiving the primary scrambled signal Sr, and is further connected to the scrambling key generator 224 by lines L13 and L15 for receiving the scrambling key signal Sk and the scramble mode signal Sm therethrough. The scrambling key signal Sk and scramble mode signal Sm are embedded to the user data area which is the extension_ and_user data(1) of the GOP layer header GH of the primary scrambled signal Ssr by the multiplexer 5. The multiplexed signal is transmitted from an output terminal 225 through a line L3 as a scrambled source signal Ss. This scrambled signal Ss may be distributed to the users by suitable facilities such as a broadcasting system.

Figure 2:
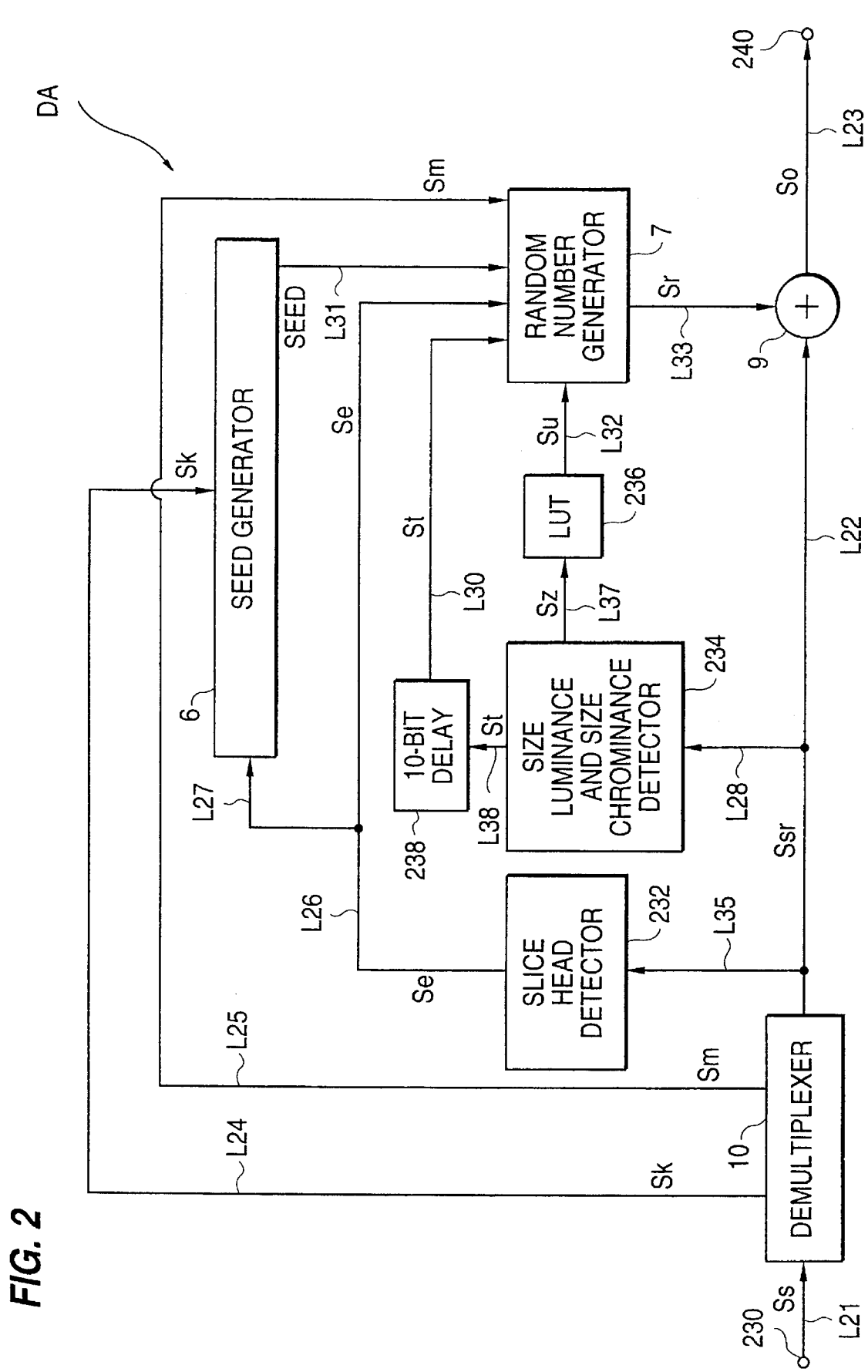
FIG. 2 is a block diagram showing a descrambling apparatus used in the scrambled transmission system according to the present invention.

Referring to FIG. 2, a descrambling apparatus according to the present invention is shown. The descrambling apparatus DA has a construction similar to that of the scrambling apparatus SA. An input port 230, slice head detector 232, seed generator 6, size luminance and size chrominance detector 234, look-up table 236, 10-bit delay 238, random number generator 7, exclusive-OR operator 9, and output port 240 having the constructions and functions very similar to those of corresponding members 210, 214, 1, 216, 222, 218, 2, 4. and, 226, respectively, of FIG. 1 are provided. However, no member corresponding to the scrambling key generator 224, GOP head detector and multiplexer 5 of FIG. 1 is provided for the descrambling apparatus DA.

However, a demultiplexer 10 connected to the input terminal 230 by a line L21 is provided for demultiplexing the scrambling key signal Sk and scramble mode signal Sm from the user data area of each GOP layer header of the scrambled source signal Ss and reproducing the primary scramble signal Ssr. The demultiplexer 10 transmits the signal Sk to the seed generator 6 through a line L24, the signal Sm to the random number generator 7 through a line L25, and the primary scrambled signal Ssr to the exclusive-OR operator 9 through a line L22.

The slice head detector 232 is connected to the line L22 by a line L35 for detecting the slice head SH of signal Ssr to produce the operation request signal Se. The slice head detector 232 transmits the signal Se to the random number generator 7 and the seed generator through lines L26 and L27, respectively.

The seed generator 6 also initializes its internal state using the scrambling key signal Sk, generates the seed signal SEED each time the operation request signal Se is input thereto, and outputs the signal SEED to the random number generator 7 through a line L31. Since the signal SEED is a random number determined at a predetermined pattern with respect to the value of the scrambling key signal Sk, as described previously, the same seed signal SEED by which the random number generator 2 is operated to produce the random number Sr by the scrambling apparatus SA is reproduced.

The size luminance and size chrominance detector 234 reads each code in the scrambled signal Ssr to detect the dct_dc_size luminance code SL and dct_dc_size$_{13}$ chrominance code SC, and obtains the code length of the dct_dc_differential code SD. The detector 234 outputs the scramble timing signal St to the 10-bit delay 238 through a line 38 and the bit length signal Sz to the look-up table 236 through a line L37. When the slice start code SSD is detected, the operation request signal Se is output to the seed generator 6, and the random number generator 7. The 10-bit delay 238 transmits the signal St delayed thereby for a period of 10 bits to the random number generator 7 through a line L30. The look-up table 236 transmits the bit length code Su to the random number generator 7 through a line L32.

When the random number generator 7 receives the scramble timing signal St, it also receives the reproduced signal SEED used by the scrambling apparatus SA with respect to the scrambling key signal Sk. Only when the timing signal St is output from the 10-bit delay 238, the random number generator 7 reproduces the same random number Sr with respect to the reproduced seed signal SEED, and outputs the reproduced random number Sr to the exclusive-OR circuit 9 through a line L33. Thus, the same random number Sr applied to the source signal So (SD) by the random number generator 2 can be applied to the scrambled source signal Ss (Ssr), and the source signal So can be reproduced. Then, the reproduced source signal So is transmitted to the output port 24 through a line L23.

What happens in the above apparatus when a bit error occurs during transmission of a scrambled signal is compared below with what happens when a bit error occurs during transmission of an unscrambled signal.

When the signal is not scrambled, the worst-case scenario is that the signal received subsequent to the bit error will be unreadable because the transmission signal uses variable length coding, the reproducing apparatus will not be able to reproduce the source signal until the next reserved code is detected, and reproduction will resume from the next slice because the synchronization of signal reproduction is recovered using that next reserved code.

when the signal is scrambled, however, code detection by the demultiplexer 10 will be disabled when a bit error occurs. It will therefore not be possible to detect the scrambled part of the subsequently received scrambled signal, random number synchronization will be lost, and reproduction will not be possible. Code detection is re-enabled when the code detector 8 detects the next reserved code, and detection of the scrambled part of the signal is possible from the next slice. However, because the initialization command is input to the random number generator 7 at the beginning of the next slice, the random number generator 7 is re-initialized using the scrambling key from the scrambling key generating means 6. Random number synchronization is therefore simultaneously restored, scrambled signal processing is resumed from the beginning of the next slice, and error recoverability is thus equivalent to that when the transmitted signal is not scrambled.

By means of the above embodiment, the header start code SSD of the source signal slice SLC is detected by the slice head detector 214, and the random number generator 2 is initialized according to the detected signal. As a result, the source signal So is scrambled using a random number sequence that is initialized at the beginning of each slice SLC, and a scrambled transmission system providing high recoverability of synchronization during signal reproduction can be provided.

It is to be noted that a random number generator (seed generator 6) is used as the means of generating the scrambling key (SEED) generated from the scrambling key Sk in the preceding embodiment, but any other means may be alternatively used insofar as the scrambling key (SEED) can be generated from the scrambling key (Sk), and it is difficult to obtain the scrambling key (Sk) from the generated scrambling key (SEED). In addition, the scrambling key (SEED) is generated according to a scrambling key request signal (Se) from the slice head detector 232, and is then applied to the random number generator 7 in the preceding embodiment, but if the slice head detector 232 simultaneously sends the slice address information to the scrambling key generator 6, the seed of non-recoverable slices SLC is destroyed inside the seed generating means 6 based on the address information of the recovered slice, the scrambling key (Sk) corresponding to the recovered slice can be applied to the random number generator 7, and greater reliability can be achieved even when a bit error spans plural slices.

Furthermore, the scrambling key Sk is often encrypted using a higher order encryption key, and the key transmission means shall not be limited to using the same transmission path as in the embodiment above. Various other means are conceivable, including using a separate transmission path, and a key that is known in advance by both transmission and receiving sides, and any means whereby the scrambling key can be made known to the receiving side may be used.

However, instead of embedding the scramble key signal Sm and the scramble mode signal Sm are embedded to the GOP head GH in this embodiment, it is also possible to construct such that the scrambling apparatus SA embeds the seed signal SEED to the slice head SH and that the descrambling apparatus DA reproduces the seed signal SEED in the each slice head SH of the scrambled signal Ss.

Figure 5:
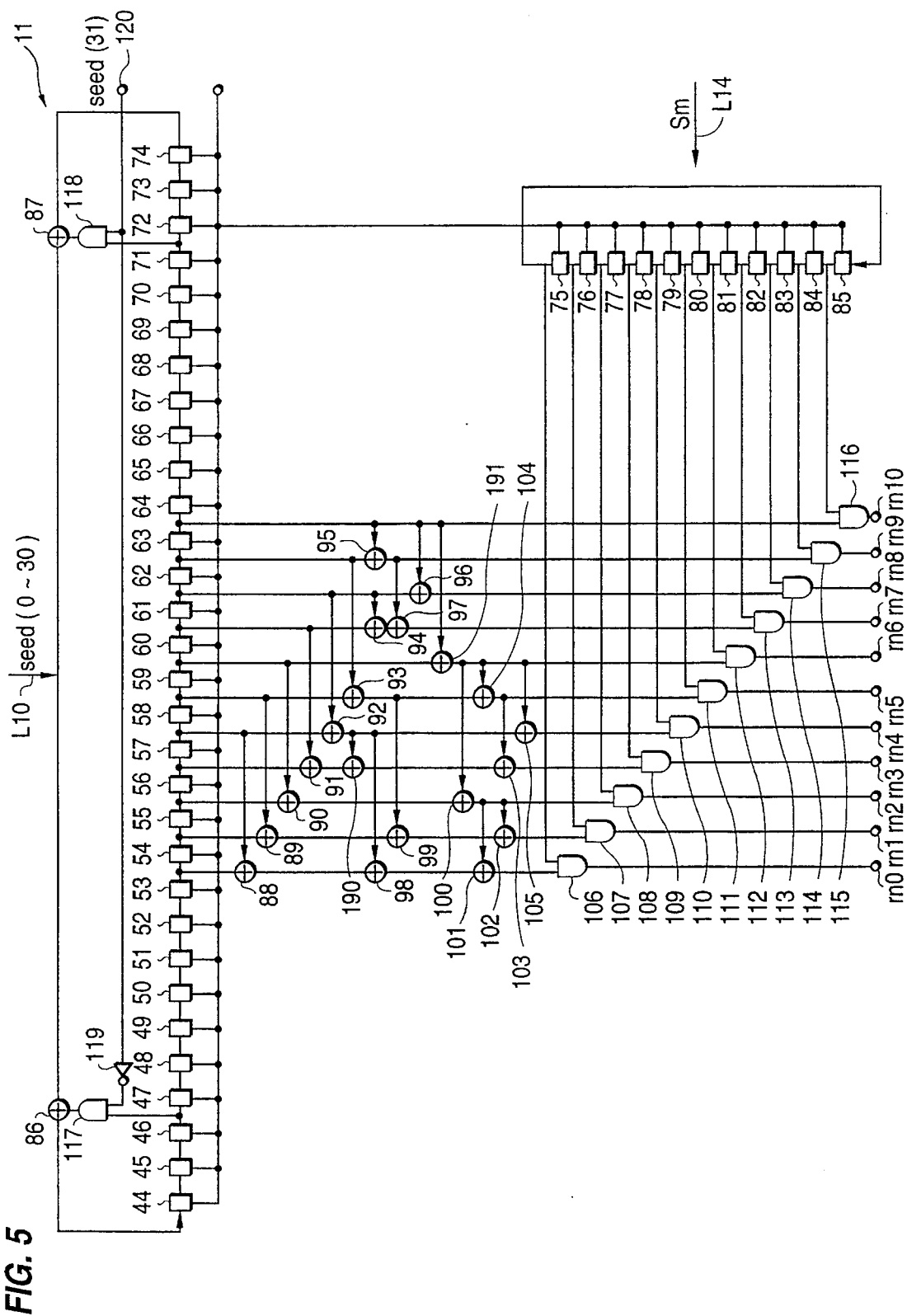
FIG. 5 is a block diagram showing a modification of random number generator of FIG. 4.

Referring to FIG. 5, a modification of random number generator of FIG. 4 is shown. This modified random number generator 2 includes a random number generation unit 11 and forty two of flip-flop circuits 44 to 85, which are wired to enable a common shift clock pulse signal to be input to each flip-flop circuit. The generation unit 11 further includes twenty two of exclusive-OR circuits 86 to 105, 190, and 191; eleven of OR circuits 106 to 116; two of AND circuits 117 and 118; and an inverter 119, which are connected to each other as shown in FIG. 5.

Each of a first input of AND circuits 106 to 116 is connected to each of lines connecting adjacent two of flip-flop circuits 53 to 64; each of second input thereof is connected to each of flip-flop circuits 75 to 85; and each output thereof is connected to output terminals rn0 to rn10, respectively. The exclusive-OR circuits 88 to 105, 190, and 191 are arranged on the eleven lines connecting the eleven of first input of AND circuit 106 to 116 to the flip-flops, as shown.

It is to be noted that each of flip-flop circuit 44 to 74 has an input terminal connected to each a single wire of the cable line L10 for receiving a single bit of the seed signal SEED therethrough. Each of flip-flop circuit 75 to 85 has an input terminal connected to each a single wire of cable line L14 for receiving a single bit of the scramble mode signal Sm (11 bit). However, these input terminals are not shown in FIG. 5 for the sake of brevity.

In operation, thus comprised random number generation unit 11 is first initialized by a known value. The inputs to the random number generation unit 11 are the 32-bit seed, and the 11-bit rate signal Sm. The low 31 bits of the seed are set to flip-flop circuits 44 to 74, and the high one bit of the seed is set as the input signal to the AND circuit 118 and the inverter 119 from an input terminal 120. The scramble mode signal Sm is set to flip-flop circuits 75 to 85. The flip-flop circuits 44 to 74, AND circuits 117 and 118, and exclusive-OR circuits 86 and 87 form the random number generator that generates the maximum period sequence.

When the most-significant bit (MSB) of the seed is '1', the output of AND circuit 118 is ON, and the maximum period sequence is generated from the primitive polynomial $(1-x^{28}-x^{31})$.

When the MSB of the seed is '0', the output of AND circuit 117 is ON, and the random number sequence of the maximum period sequence is generated from the primitive polynomial $(1-x^3-x^{31})$ at each shift clock pulse.

Because the primitive polynomials $(1-x^{28}x^{-31})$ and $(1-x^3-x^{31})$ are mutually reciprocal polynomials, the random numbers resulting from the polynomials are generated in a mutually reverse sequence. The outputs from flip-flop circuits 53 to 63 are used as the output of the maximum period sequence random number generating means at this time. These random number sequences are the same random number sequences shifted once in sequence starting from the signal of flip-flop circuit 53. By next obtaining the exclusive-OR of these outputs using exclusive-OR circuits 88 to 105, 190, and 191, the adjacent values are random number sequences shifted by 262,142 shift clocks. This is possible as follows.

When flip-flop circuit 63 obtains the exclusive-OR of the output of the adjacent flip-flop circuit 62, the resulting signal is delayed or advanced by 262,142 shift clocks from the output of flip-flop circuit 63.

Thus, the exclusive-OR of the output of flip-flop circuit 63 and flip-flop circuit 61 is equivalent to the exclusive-OR of the exclusive-OR of flip-flop circuits 63 and 62, which is delayed or advanced by 262,142 shift clocks, and the exclusive-OR of flip-flop circuits 61 and 62, which is delayed or advanced one more shift, and a signal delayed or advanced two times, or 524,284 shift clocks, is generated. By thereafter combining exclusive-OR operations using the same method, the signals are delayed or advanced by the specified number of shifts. Processing with the scramble mode signal sm is described next. The signal set to flip-flop circuits 75 to 85 is one-cycle shifted each shift clock. The AND of the output from each flip-flop and the output of the random number generator is then obtained. As a result, when any bit of the 11-bit pattern of the rate signal is set to '1', only output terminals rn0–rn10 corresponding to that '1' bit output(s) the maximum period sequence random number. But, when this any bit of the pattern is '0', the output from the output terminals rn0 to rn10 remain '0'. Thus, if the ratio of zeros to ones in the scramble mode signal sm is 't', the ratio of zeros to ones in the outputs rn0–rn10 is (t×½), and the random number ratio is thus controlled by the scramble mode signal Sm.

By means of the embodiment thus described, the feedback position of the random number generator can be easily controlled by providing a most-significant bit in the seed and providing AND circuits 117 and 118. In addition, because outputs terminals rn0 to rn10 are set to a signal delayed by an equal shift clock count, the relationship between adjacent outputs is completely symmetrical even when the most significant bit of the seed is switched. Therefore, the shift count which can be used without using the position where adjacent random numbers overlap in the single maximum period sequence random number does not changes.

It is to be noted that a maximum period sequence consisting of a 31-bit shift register is used in the preceding embodiments, but a different maximum period sequence may be alternatively generated.

In addition, the number of outputs must only be equal to the number required. The phase difference between outputs does not need to be equal, and only needs to be separated by the shift count required considering the shift count used.

The number of flip-flops used for the rate signal is equal to the number of outputs in this embodiment, but a greater number may also be used with part of the flip-flops connected to the AND circuit, or fewer flip-flops may be used and connected to plural AND circuits.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

It is apparent from the above, the scrambled transmission system whereby the period until signal reproduction is recovered when a bit error occurs is the same whether processing a signal in which the source signal contains variable length coding or processing an unscrambled signal can be obtained. The random number generator comprises plural outputs for use in the scrambling operation, and is characterized by the random number sequence from each output being usable as a discrete random number. The scrambling apparatus SA can scramble digital data containing variable length coding based on a scrambling key Sk, and the descrambling apparatus DA can reproduce the scrambled data Ss based on the scrambling key Sk. The scrambling key Sk is multiplexed in the scrambled source signals So and is transmitted from the scrambling apparatus SA to the descrambling apparatus DA.

This scrambling apparatus SA scrambles digital data So containing variable length coding SD based on a protocol determined by a specific scrambling key Sk and a scrambling key refreshing signal Se for providing the scramble seed signal SEED to produce a random number for the scrambling of the source signal So. This scramble seed signal SEED can be generated based on the scrambling key Sk. The scrambling key refreshing signal Se causes the seed signal SEED generator 6 to produce a new scramble seed signal SEED to the random number generator 2 at each smallest data unit SLC of the input data whereby synchronization can be obtained.

This descrambling apparatus DA applies an inverse conversion process based on the same protocol used by the scrambling apparatus to the scrambled source signal So for descrambling. The scrambling key refreshing signal Se is also provided to the seed generator 6 for generating the scramble seed signal SEED based on the transmitted scrambling key Sk. This newly generated scrambling seed signal SEED is applied to the inverse conversion process at the smallest data unit of the input scrambled data Ss whereby synchronization can be obtained.

By means of this configuration, the time required for normal signal reproduction to be restored when a bit error occurs in a scrambled transmission signal is equivalent to that when a bit error occurs in an unscrambled transmission signal because the scramble seed signal SEED is refreshed at the smallest synchronization unit of the signals so and Ss. In addition, because the receiving side can generate plural scramble seed signal SEED from the transmitted scrambling key Sk, it is only necessary to transmit the scrambling key Sk and it is not necessary to transmit the scramble seed signal SEED. As a result, it is possible to provide a scrambled transmission system providing excellent recoverability from bit errors at a realistic key transmission rate.

The random number generators comprises a maximum period sequence random number generation unit including plural storage means for storing bits, and shift and feedback means for shifting the signal stored to each storage circuit to the adjacent storage circuit and feeding back the linear combination of the bit values stored to the storage circuit one or more exclusive-OR operating circuits; and plural random number outputs in the form of the outputs of the storage circuits in the maximum period sequence random number generation unit, or the outputs of the exclusive-OR operating means. Each of the exclusive-OR operating circuits obtains the exclusive-OR combination of the outputs of the plural storage circuits in the maximum period sequence random number generation unit.

By means of this configuration, the outputs of the random number generator are the exclusive-OR result obtained from the same maximum period sequences shifted plural units. The sequence generated by an exclusive-OR on the same maximum period sequence shifted 'a' units is a random number sequence of the same maximum period sequence, and the shift 'b' from the position of the first random number sequence is determined by the equation $x^b=1+x^a$ (mod h(x)), wherein 'b' is greater than the dimension of h(x) which represents the primitive polynomials, and a random number sequence of the position removed the shift count from the value stored in the maximum period sequence can be generated. Therefore, because each output can be taken from different, sufficiently separated positions of the random number sequence of a single maximum period sequence by combining exclusive-OR operations, the number of bits used can be taken as discrete random number sequences from a range smaller than the phase difference of the random number sequence of each output. In addition, if the feedback method is controlled by switching between primitive polynomials that are mutually reciprocal polynomials, the same sequence will be output in a completely reversed order; complex random number sequences can therefore be generated by switching the feedback method while retaining the phase relationship between each output, and security can be improved when the random number is used for encryption.

The invention further comprises a random number generator and storage means for storing plural bits, and AND circuits. The storage circuit one-cycle shifts the stored signals synchronized to the output of the random number generation unit. The AND circuit outputs the AND of the random number generation unit's outputs and the bit outputs of the storage circuits.

By means of this configuration, because the ANDs of the data and random number generating means outputs are obtained while cycle-shifting the signals input to the storage means, a non-linear AND operation can be applied while controlling the ratio of ones and zeroes in the random number by the ratio of ones and zeroes in the signal input to the storage means, and enhanced security can be obtained when the random number is used for encryption.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A scrambled transmission system for transmitting a digital data containing variable length coding, said system comprising:
   a first scramble key generating means for generating a first scramble key at a first predetermined interval;
   a second scramble key generation means for generating a second scramble key based on said first scramble key at a second predetermined interval which is smaller than said first predetermined interval;
   a scrambling means for scrambling said digital data based on said second scramble key; and
   a multiplexing means for multiplexing said first scramble key together with said scrambled digital data.

2. A scrambled transmission system as claimed in claim 1, further comprising a first scramble key refreshing means for refreshing said first scramble key at said first predetermined interval.

3. A scrambled transmission system as claimed in claim 2, further comprising a second scramble key refreshing means for refreshing said second scramble key at said second predetermined interval.

4. A scrambled transmission system as claimed in claim 3, wherein said second interval coincides with a timing of a smallest data unit of said digital signal in which synchronization can be obtained.

5. A scrambled transmission system as claimed in claim 1, wherein said digital data conforms to an MPEG standard, said first and second predetermined intervals coinciding with a timing of a group-of-picture unit and a slice unit, respectively, of said digital data.

6. A scrambled transmission system as claimed in claim 5, wherein said multiplexed first scramble key is embedded to an extension__and__user__data of the Group-of-Picture user data area.

7. A scrambled transmission system as claimed in claim 1, wherein said scrambling means comprises:
   a code detection means for detecting a position and size of a code to which scrambling is applied in said digital data and outputting said detected position and size;
   a random number generation means for generating a random number value of the number of scrambled bits in said detected size of code; and
   a plurality of first exclusive-OR circuit means for subjecting said generated random number value and said code to an exclusive-OR operation.

8. A scrambled transmission system as claimed in claim 7, wherein said random number generation means comprises:
   a maximum period sequence random number generating means for generating a maximum period sequence random number and comprising a plurality of storage means for storing bits of a signal, and shift and feedback means for shifting each said bit stored in each of said plurality of storage means to adjacent storage means, and feeding back a linear combination of the bit values stored in said plurality of storage means; and
   an exclusive-OR operating means for obtaining the exclusive-OR combination of the outputs from said plurality of storage means in said maximum period sequence random number generating means, and having a plurality of random number outputs in either one form of the outputs of said storage means in said maximum period sequence random number generating mean, and the outputs of the exclusive-OR operating means.

9. A scrambled transmission system as claimed in claim 8, wherein said shift and feedback means comprises a selection means for selecting one of two feedback methods by means of a control signal, said feedback methods being two mutually reciprocal primitive polynomials.

10. A scrambled transmission system as claimed in claim 7, wherein said random number generation means comprises:
    a random number generator means for generating said random number value of the number of scrambled bits in said detected size of code;
    a storage means for storing a plurality of bits by one-cycle shifting said stored signals synchronized to the output of said random number generator; and
    an AND circuit for outputting the AND of the outputs from said random number generator means and the bit outputs of said storage means.

11. A scrambled transmission system as claimed in claim 7, wherein said random number generation means is a feedback means comprising a selection means for selecting one of two feedback methods used in the maximum period sequence random number generating means by means of a control signal, said feedback methods being two mutually reciprocal primitive polynomials.

12. A scrambled transmission system as claimed in claim 7, further comprising:

a first scramble key reproduction means for reproducing said first scramble key based on said multiplexed signal;

a second scramble key reproduction means for reproducing said second scramble key based on said multiplexed signal; and a descrambling means for descrambling said scrambled digital data based on said reproduced second scramble key to reproduce said digital data.

13. A scrambled transmission system as claimed in claim 12, wherein said descrambling means comprises:

a code detection means for detecting a position and size of said scrambled code to which descrambling is applied in said scrambled digital data and outputting said detected position and size to said descrambling means;

a random number reproduction means for reproducing said random number value of the number of descrambled bits in said detected size of code; and a plurality of second exclusive-OR circuit means for subjecting said reproduced random number and said code to an exclusive-OR operation.

14. A scrambled transmission system for receiving a scrambled digital data having a variable code length to reproduce a source digital data, said scrambled data being produced by scrambling said source data based on first and second scramble keys, said system comprising:

a first scramble key means for reproducing said first scramble key of a first predetermined interval from said scrambled digital signal;

a second scramble key reproduction means for reproducing said second scramble key, having a value based on said first scramble key, of a second predetermined interval which is smaller than said first predetermined interval from said scrambled signal; and a descrambling means for descrambling said scrambled digital data based on said reproduced second scramble key to reproduce said source digital data.

15. A scrambled transmission system, as claimed in claim 14, further comprising:

a code detection means for detecting a position and size of scrambled code to which descrambling is applied in said scrambled digital data and outputting said detected position and size to said descrambling means;

a random number reproduction means for reproducing a random number value of the number of descrambled bits in said detected size of code; and a plurality of second exclusive-OR circuit means for subjecting said reproduced random number and said code to an exclusive-OR operation.

16. A scrambled transmission system for transmitting a digital data containing variable length coding, said system comprising:

a scramble key generation means for generating first scramble key at a first predetermined interval and a second scramble key at a second predetermined interval which is smaller than the first predetermined interval and which coincides with a timing of a smallest data unit at which synchronization can be obtained;

a scrambling means for scrambling said digital data based on at least one of said first and second scramble keys; and a multiplexing means for multiplexing at least one of said first and second scramble keys together with said scrambled digital data.

17. A scrambled transmission system for receiving a scrambled digital data having a variable code length to reproduce a source digital data, said scrambled data being produced by scrambling said source digital data based on a first scramble key and a second scramble key, said system comprising:

a scramble key reproduction means for reproducing said first scramble key at a first predetermined interval and said second scramble key at a second predetermined interval which is smaller than the first predetermined interval and which coincides with a timing of a smallest data unit at which synchronization can be obtained based on said scrambled signal; and a descrambling means for descrambling said scrambled digital data based on at least one of said reproduced first and second scramble keys to reproduce said source digital data.

18. A transmission system for scrambling motion picture variable length coded source data, the source data including a sequence of coded picture groups, each of the coded picture groups including a group header and a sequence of pictures, each of the pictures including a picture header and a sequence of picture slices, each of the picture slices including a slice header and a sequence of picture blocks, said system comprising:

a scramble key generator for generating a scramble key at a timing of each group header of the source data;

a seed generator for generating a scramble seed, based on the scramble key, at a timing of each slice header of the source data;

a random number generator for scrambling the source data based on the scramble seed to obtain scrambled data; and a multiplexer for multiplexing the scramble key with the scrambled data.

19. A transmission system as claimed in claim 18, further comprising a group head detector for causing said scramble key generator to refresh the scramble key upon detecting each group header of the source data.

20. A transmission system as claimed in claim 19, further comprising a slice head detector for causing said seed generator to refresh the scramble seed upon detecting each slice header of the source data.

21. A transmission system as claimed in claim 18, wherein said multiplexer embeds the scramble key in a user data area of each group header of the scrambled data.

* * * * *